United States Patent [19]

Tsuboshima

[11] 4,403,180

[45] Sep. 6, 1983

[54] POSITION CONTROLLING DEVICE

[75] Inventor: Kosaku Tsuboshima, Hachiouji, Japan

[73] Assignee: Olympus Optical Co., Ltd., Tokyo, Japan

[21] Appl. No.: 312,916

[22] Filed: Oct. 19, 1981

[30] Foreign Application Priority Data

Oct. 20, 1980 [JP] Japan .................................. 55-145740

[51] Int. Cl.³ .............................................. G05B 1/06
[52] U.S. Cl. .................................... 318/640; 318/282; 318/626; 318/467
[58] Field of Search ................ 318/282, 640, 467, 626, 318/480; 350/531

[56] References Cited

U.S. PATENT DOCUMENTS

| 2,454,832 | 11/1948 | Paulus | 318/282 |
| 3,504,259 | 3/1970 | Dalton | 318/282 X |
| 3,938,016 | 2/1976 | Lange et al. | 318/467 |
| 4,335,340 | 6/1982 | Hara et al. | 318/282 |

Primary Examiner—B. Dobeck
Attorney, Agent, or Firm—Cushman, Darby & Cushman

[57] ABSTRACT

A position controlling device including a shielding plate which can be moved by a motor, three pairs of light emitting elements and light receiving elements arranged on both sides of the shielding plate and a motor controlling circuit which can control the normal rotation, reverse rotation and stop of the motor with output signals from the light receiving elements and a foot switch or centering switch simple in the formation and making no misoperation with a noise.

7 Claims, 4 Drawing Figures

FIG. 1
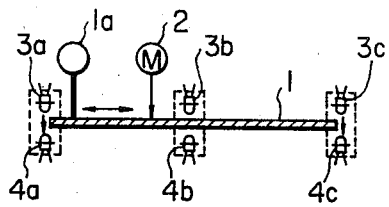
FIG. 2
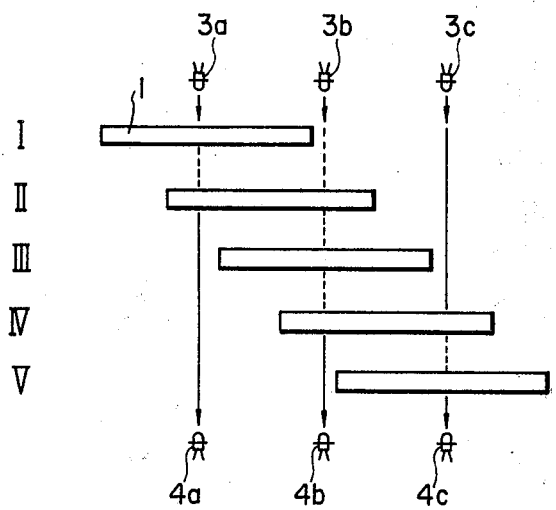
FIG. 3
|     | 4a  | 4b  | 4c  |
|-----|-----|-----|-----|
| I   | OFF | ON  | ON  |
| II  | OFF | OFF | ON  |
| III | ON  | OFF | ON  |
| IV  | ON  | OFF | OFF |
| V   | ON  | ON  | OFF |

POSITION CONTROLLING DEVICE

BACKGROUND OF THE INVENTION (a) Field of the Invention

This invention relates to position controlling devices for movable members and more particularly to a device adapted to control the movement and stop of the mirror body of a microscope for medical operations or the stage and the like of various kinds of microscope.

(b) Description of the Prior Art

Generally, in a microscope for medical operations or the like, it is desirable that the position on the X-and Y-coordinates of the mirror body can be easily detected by a simple detecting mechanism and the movement of the mirror body can be remote-controlled by a foot switch or the like. It is also desirable that the mirror body can automatically stop when it comes to both limit positions of its moving range and can be automatically brought to the center position of its moving range by the operation of a switch. It is further desirable that, in order to meet such desires, the mirror body position controlling device should be simple in the circuit formation and should make no misoperation with a noise.

SUMMARY OF THE INVENTION

An object of the present invention is to provide a position controlling device which can well meet the above mentioned desires.

According to the present invention, this object can be attained by providing a movable member position detecting means, an encoder which can convert an input signal form the position detecting means to an output signal, a means of controlling the drive of a motor for moving the movable member, a first switch means which can remote-control the rotating direction of the motor and a second switch means which can automatically return the movable member to the center position of its moving range so that, when the movable member is in the limit positions of the moving range, the motor will be inoperative.

According to a preferred formation of the present invention, respective pairs of position detecting means, encoders, motor drive controlling means, first switch means and second switch means are provided so that one of each pair will be used to move the movable member in the X-coordinate direction, the other of each pair will be used to move it in the Y-coordinate direction and thereby the position on the X-and Y-coordinates of the movable member having, for example, a mirror body can be easily detected.

According to another formation of the present invention, the first switch means is a foot switch and is therefore easy to operate and the motor drive control is made by an encoded signal, therefore will make no misoperation and can be simplified in the circuit formation.

BRIEF DESCRIPTION OF THE DRAWINGS

FIG. 1 is an explanatory view of an X-coordinate direction position detecting mechanism of an embodiment of a position controlling device according to the present invention;

FIG. 2 is an explanatory view showing various moved positions of a shielding plate in the position detecting mechanism shown in FIG. 1;

FIG. 3 is a table showing outputs issued from respective light receiving elements in response to the respective positions of the shielding plate shown in FIG. 2.

DESCRIPTION OF THE PREFERRED EMBODIMENT

Figure 4:
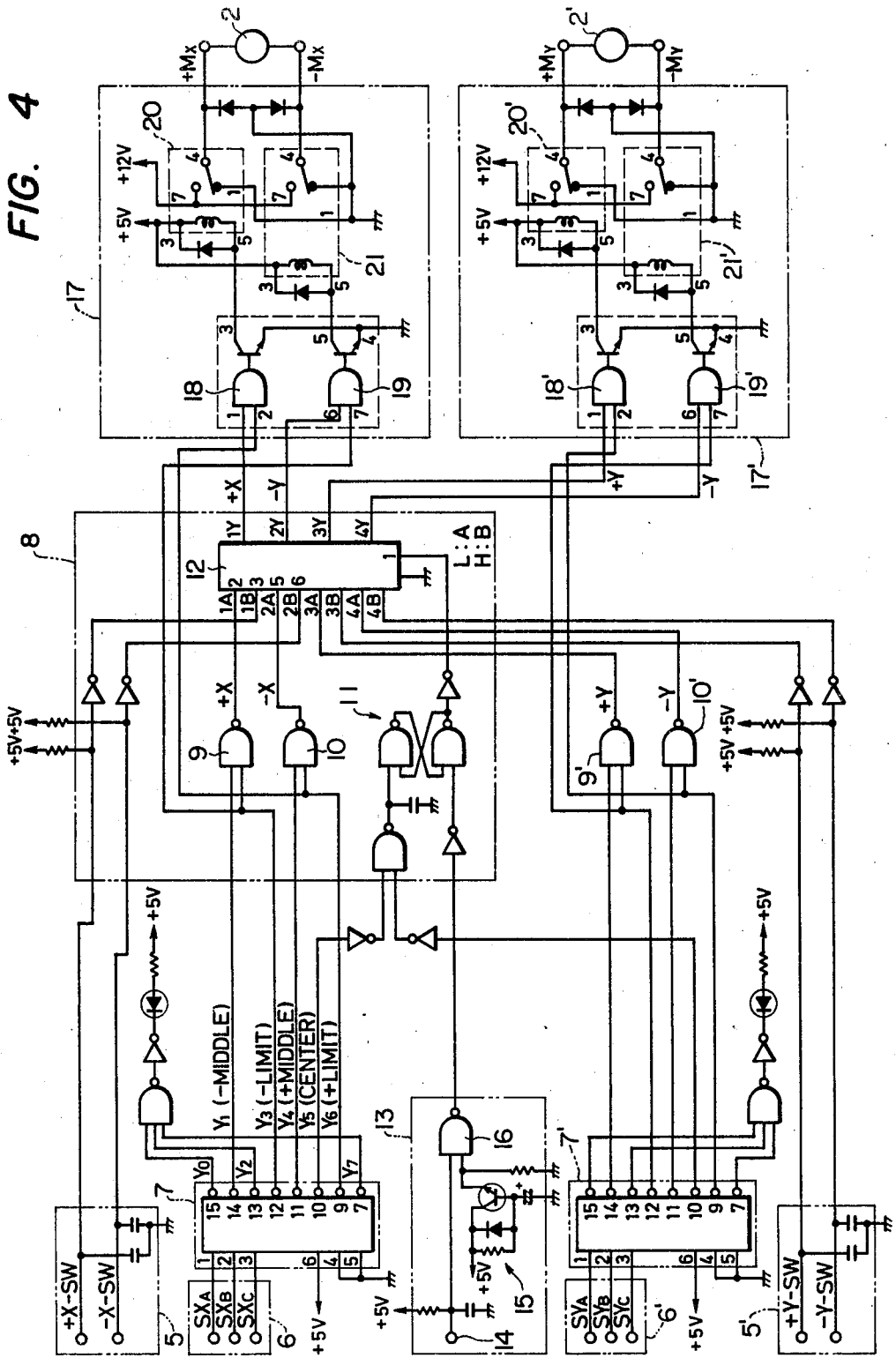
FIG. 4 is a wiring diagram of a position controlling circuit part used together with the detecting mechanism in FIG. 1 and a position controlling circuit part used together with a Y-coordinate direction position detecting mechanism.

In FIG. 1 showing an X-coordinate direction position detecting mechanism, the reference numeral 1 denotes a shielding plate which can be moved in the directions indicated by the arrows (the +X direction and −X direction) within a predetermined range integrally with a mirror body 1a by a motor 2, the symbols 3a, 3b and 3c denote light emitting elements arranged respectively in the + limit position, center position and − limit position of the moving range of the shielding plate 1 in such fixed part as a microscope body not illustrated and the symbols 4a, 4b and 4c denote light receiving elements arranged respectively as opposed to the light emitting elements 3a, 3b and 3c with the shielding plate between them in such fixed part as a microscope. The shielding plate 1 can take positions I to V shown in FIG. 2 and the outputs of the light receiving elements 4a, 4b and 4c in those respective positions are as shown in FIG. 3. That is to say, the position I is the + limit position of the moving range of the shielding plate 1. In this case, only the light emitted from the light emitting element 3a will be intercepted by the shielding plate 1, therefore the light receiving element 4a will be off and the other light receiving elements 4b and 4c will be on. The position II is the + intermediate position of the moving range of the shielding plate 1 in which the light receiving elements 4a and 4b will be off and the light receiving element 4c will be on. The position III is the center position of the moving range of the shielding plate 1 in which the light receiving element 4b will be off and the light receiving elements 4a and 4c will be on. The position IV is the − intermediate position of the moving range of the shielding plate 1 in which the light receiving element 4a will be on and the light receiving elements 4b and 4c will be off. The position V is the − limit position of the movement of the shielding plate 1 in which the light receiving elements 4a and 4b will be on and the light receiving element 4c will be off. Therefore, by reading off the outputs of the light receiving elements 4a, 4b and 4c, the position of the shielding plate 1, that is, the position on the X-coordinate of the mirror body 1a can be detected and further, by putting these outputs as position detecting signals into the later described electric circuit, the position of the mirror body 1a can be controlled.

In FIG. 4 showing an electric circuit part of a position controlling device according to the present invention, to explain particularly the X-coordinate direction position controlling mechanism part, the reference numeral 5 denotes a remote-control switch part in which the symbols +X−SW and −X−SW denote foot switches generating signals for moving the mirror body 1a respectively in the +X direction and −X direction, 6 denotes a light receiving element part in which the symbols $SX_A$, $SX_B$ and $SX_C$ denote amplified signals respectively from the light receiving elements 4a, 4b and 4c and 7 denotes an encoder which encodes the signals $SX_A$, $SX_B$ and $SX_C$ and generates output signals $Y_1$ (in the − intermediate position), $Y_3$ (in the − limit position), $Y_4$ (in the + intermediate position), $Y_5$ (in the center position) and $Y_6$ (in the + limit position) corresponding respectively to the positions IV, V, II, III and I of the shielding plate 1 shown in FIG. 2. The reference numeral 8 denotes a motor controlling part formed of NAND gates 9 and 10, a flip-flop 11 and a circuit 12 made to select one of two inputs as described above so that, among the signals from the encoder 7, the signals $Y_1$ and $Y_3$ will be put into the terminal 2 of the circuit 12 through the NAND gate 9 as signals moving the shielding plate 1 in the +X direction, the signals $Y_4$ and $Y_6$ will be put into the terminal 5 of the circuit 12 through the NAND gate 10 as signals moving the shielding plate 1 in the −X direction, the signal $Y_5$ will be put into the terminal 1 of the circuit 12 through the flip-flop. By the way, the circuit 12 has a function of selecting putting out the inputs on the side A when the signals put into the terminal 1 are low and selecting and putting out the inputs on the side B when said signals are high. The reference numeral 13 denotes a centering switch part formed of a centering switch 14, a signal generating circuit 15 which will generate a signal when the current source (not illustrated) of the entire device is on and a NAND gate 16 so that the signal generated herein will be put into the terminal 1 of the circuit 12. The reference numeral 17 denotes a motor driving part formed of AND gates 18 and 19 and relay switches 20 and 21 so that the signal $Y_6$ from the encoder 7 and the signal from the circuit 12 for moving the shielding plate 1 in the +X direction will be put into the AND gate 18, the signal $Y_3$ from the encoder 7 and the signal from the circuit 12 for moving the shielding plate 1 in the −X direction will be put into the AND gate 19, the relay switch 20 will be operated to normally rotate the motor 2 when the out-put of the AND gate 18 is high and the relay switch 21 will be operated to reversely rotate the motor 2 when the output of the AND gate 19 is high.

The operation of this position controlling mechanism shall be explained in the following. Now, if the shielding plate 1 is in the position II, only the signal $Y_4$ (in the + intermediate position) among the output signals of the encoder 7 will be low but the others will be high and therefore one input of either of the AND gates 18 and 19 of the motor driving part 17 will be high. In this state, if the foot switch +X−SW of the remote-control switch part 5 is set on, the input into the input terminal 3 on the side B of the circuit 12 will be high. On the other hand, the output of the NAND gate 16 of the centering switch part 13 will be low and therefore the input into the input terminal 1 of the circuit 12 will be made high by the action of the flip-flop 11. That is to say, the input terminal on the side B will be selected. Therefore, the high signal will be put as it is into the other input terminal of the AND gate and the output of the AND gate 18 will be high. Therefore, the relay switch 20 will operate to normally rotate the motor 2 to move the mirror body 1a together with the shielding plate 1 in the +X direction. If the foot switch −X−SW is set on, the input into the input terminal 6 on the side B of the circuit 12 will be high. Therefore, by the same principle as is mentioned above, the output of the AND gate 19 will become high and the relay switch 21 will operate to reversely rotate the motor 2 to move the mirror body 1a together with the shielding plate 1 in the −X direction. Thus, the movement of the mirror body 1a will be remote-controlled by the foot switch and also in the same manner in case the shielding plate 1 is in the positions III and IV. However, if the shielding plate 1 is in the position I, of the output signals of the encoder 7, only the signal $Y_6$ (in the + limit position) will be low and the others will be high. Therefore, one input of the AND gate 18 will become low. Even if the foot switch +X−SW is set on, the output of the AND gate 18 will be low, therefore the normal rotation of the motor 2 will be impossible and the movement of the mirror body 1a and shielding plate 1 in the +X direction will be prohibited. On the other hand, as one input of the AND gate 19 will remain high as it is, the reverse rotation of the motor 2 will be possible. By setting the foot switch −X−SW on, the mirror body 1a and shielding plate 1 can be moved in the −X direction. Thus the control in the case that the mirror body 1a is in the limit position in the +X direction can be made. Even in case the shielding plate 1 is in the position V, the control in the case that it is in the limit position in the −X direction will be made by the same principle.

The automatic return of the mirror body 1a to the center position shall be explained in the following. In this case, too, if the shielding plate 1 is in the position II at first, of the output signals of the encoder 7, only the signal $Y_4$ (in the + intermediate position) will be low and the others will be high. Therefore, one input of either of the AND gates 18 and 19 of the motor driving part 17 will be high. Further, as both inputs of the NAND gate 9 of the motor controlling part 8 are high, the output of said NAND gate 9 will be low. As one input of the NAND gate 10 is low, the output of said NAND gate 10 will be high. Therefore, the input terminal 2 on the side A of the circuit 12 will be low and the input terminal 5 will be high. Now, in this state, if the switch 14 of the centering switch part 13 is set on for a moment, one input of the NAND gate 16 will be low and therefore the output of said NAND gate 16 will be high. Therefore, by the action of the flip-flop 11, the input into the input terminal 1 of the circuit 12 will be kept low. That is to say, the input terminal on the side A will be selected. Therefore, the high signal will be put as it is into the other input terminal of the AND gate 19 and therefore the output of the AND gate 19 will become high. Therefore, the relay switch 21 will operate to reversely rotate the motor 2 to move the mirror body 1a together with the shielding plate 1 in the −X direction. When the shielding plate 1 reaches the position III, that is, the center position, of the ouput signals of the encoder 7, only the signal $Y_5$ (in the center position) will be low and the others will be high. Therefore, both inputs of either of the NAND gates 9 and 10 of the motor controlling part 8 will be high and therefore the outputs of both NAND gates 9 and 10 will be low. Therefore, one input of either of the AND gates 18 and 19 of the motor driving part 17 will be low, the outputs of both AND gates 18 and 19 will be low and, as a result, the motor 2 will stop and the mirror body 1a will stop together with the shielding plate 1. Thus, the lens body 1a will automatically return to the center position. Even in case the shielding plate 1 is in the other positions I, III, IV and V, the automatic return to the center position will be made by the same principle. Further, if the current source switch (not illustrated) is set on the start the operation of this position controlling mechanism, the circuit 15 of the centering switch part 13 will generate a signal to make the other input of the NAND gate 16 low and the output of said NAND gate 16 high. Therefore, by the same principle as when the switch 14 is set on for a moment, the automatic return of the mirror body to the center position will be made. By the way, when the shielding plate 1 reached the center position III, the signal $Y_5$ (in the center position) will become low and therefore, by the action of the flip-flop 11, the input into the input terminal 1 of the circuit 12 will be returned to be high. That is to say, the input terminal on the side B will be selected. Therefore, it will be possible to control the position again with the foot switch part 5.

The mechanism of controlling the position of the shielding plate 1 in the X-coordinate direction has been explained in the above. If a mechanism of controlling the position of the shielding plate 1 in the Y-coordinate direction of fundamentally the same formation as of it is combined with it, the position of the shielding plate 1 in the X-and Y-coordinate directions will be able to be controlled. The circuit part of the mechanism of controlling the position of the shielding plate 1 in the Y-coordinate direction is also shown in FIG. 4. However, as described above, it is the same as the circuit part of the X-coordinate direction position controlling mechanism in the formation and operation. Therefore, the same elements as the circuit elements used in the above described explanation shall be only denoted with the respective corresponding reference numerals with dashes (') attached and shall not be explained in detail. As evident also from FIG. 4, the centering switch part 13, flip-flop 11 and circuit 12 are used in common in the X-coordinate direction position controlling circuit and Y-coordinate direction position controlling circuit.

The above explanation has been made on the case of the application to a microscope for medical operations in which the movable member to be controlled in the position is formed as a shielding plate 1 having a mirror body 1a. However, the present invention is not limited to it. That is to say, the position controlling device according to the present invention can be applied also to the position control of the stages of biological microscopes, metallurgical microscopes and stereoscopic microscopes.

I claim:

1. A position controlling device comprising a first means for detecting the position of a movable member, an encoder which is connected to said first means and can convert an input signal from said first means to a predetermined output signal, a second means which is connected to said encoder and can control the drive of a motor for moving said movable member, a first switch means which is connected to said second means and can remote-control the rotating direction of said motor and a second switch means which is connected to said second means and can automatically return said movable member to the center position of its moving range, said motor being made inoperative by the operation of said first and second means when said movable member is in the limit position of its moving range.

2. A position controlling device according to claim 1 comprising respective pairs of said first means, encoders, second means, first switch means and second switch means, one of each said pair being used to move said movable member in the X-coordinate direction and the other being used to move said movable member in the Y-coordinate direction.

3. A position controlling device according to claim 1 or 2 wherein said movable member carries a mirror body of a microscope for medical operations.

4. A position controlling device according to claim 1 or 2 wherein said movable member is a stage of a microscope.

5. A position controlling device according to claim 1 or 2 wherein said first switch means is a foot switch.

6. A position controlling device according to claim 1 or 2 wherein said second switch means includes a centering switch and a signal generating circuit which can generate a signal when said position controlling device is in the operable state.

7. A position controlling device according to claim 1 wherein said first means comprises a movalbe shielding plate, three light emitting elements arranged at both ends in the middle of the moving range of said shielding plate on one side of said shielding plate and three light receiving elements arranged as opposed respectively to said three light emitting elements on the other side of said shielding plate.

* * * * *